United States Patent
Cheng et al.

(10) Patent No.: US 8,393,778 B2
(45) Date of Patent: Mar. 12, 2013

(54) BACKLIGHT MODULE AND A WIRE POSITIONING DEVICE THEREOF

(75) Inventors: Chi-Chen Cheng, Hsin-Chu (TW); Chi-Chung Lo, Hsin-Chu (TW)

(73) Assignee: AU Optronics Corporation, Hsin-Chu (TW)

( * ) Notice: Subject to any disclaimer, the term of this patent is extended or adjusted under 35 U.S.C. 154(b) by 0 days.

(21) Appl. No.: 13/325,345

(22) Filed: Dec. 14, 2011

(65) Prior Publication Data

US 2012/0140512 A1    Jun. 7, 2012

Related U.S. Application Data

(62) Division of application No. 11/943,752, filed on Nov. 21, 2007, now Pat. No. 8,096,697.

(30) Foreign Application Priority Data

Feb. 16, 2007 (TW) ................................ 96106309 A

(51) Int. Cl.
 *F21V 7/04* (2006.01)
(52) U.S. Cl. ........................................ 362/630; 362/633
(58) Field of Classification Search ........ 362/97.1–97.3, 362/630, 632–634; 349/58
See application file for complete search history.

(56) References Cited

U.S. PATENT DOCUMENTS

| | | | |
|---|---|---|---|
| 5,729,310 A | 3/1998 | Horiuchi et al. | |
| 6,719,436 B1 * | 4/2004 | Lin et al. | 362/612 |
| 6,831,424 B2 | 12/2004 | Youn et al. | |
| 7,093,969 B2 * | 8/2006 | Wang et al. | 362/632 |
| 2003/0117807 A1 | 6/2003 | Hur et al. | |
| 2004/0252252 A1 | 12/2004 | Lee et al. | |

FOREIGN PATENT DOCUMENTS

| | | |
|---|---|---|
| JP | 2002367425 A | 12/2002 |
| TW | 238267 | 8/2005 |
| TW | 240833 | 10/2005 |
| TW | 200602752 | 1/2006 |

OTHER PUBLICATIONS

Chinese language office action dated Apr. 18, 2008.
Taiwan Office Action dated May 17, 2011.

* cited by examiner

*Primary Examiner* — Jason Moon Han
(74) *Attorney, Agent, or Firm* — McClure, Qualey & Rodack, LLP

(57) ABSTRACT

A backlight module and a wire positioning/holding device for the frame structure thereof are disclosed. The backlight module mainly includes a frame and a light source module. The light source module is disposed on the lateral side or on the bottom of the frame. The wire holding device mainly includes a main body and a winding pillar. A first guide slot is disposed on the main body, and the first guide slot has an inlet end and an outlet end. The winding pillar extends from the main body and is situated at one side of the first guide slot. The winding pillar and the main body together form a wire holding portion. The wire holding portion is disposed corresponding to the outlet end of the first guide slot to receive the wires of the light source module coming out of the outlet end.

9 Claims, 6 Drawing Sheets

BACKLIGHT MODULE AND A WIRE POSITIONING DEVICE THEREOF

This is a divisional application of patent application Ser. No. 11/943,752 filed on Nov. 21, 2007, now U.S. Pat. No. 8,096,697. The prior application Ser. No. 11/943,752 claims the benefit of Taiwan Patent Application No. 096106309 filed on Feb. 16, 2007, the disclosures of which are incorporated herein by reference in their entirety.

BACKGROUND OF THE INVENTION

1. Field of the Invention

The present invention relates generally to a backlight module and a wire positioning/holding device for the frame structure, and more particularly to a backlight module used in a liquid crystal display (LCD) device and a wire holding device for the frame structure.

2. Description of the Prior Art

Backlight modules are used extensively in liquid crystal display (LCD) devices, computers keyboards, cell phone buttons, billboards and other devices requiring light sources to provide the necessary flat light sources for these devices. Especially, the recent market demand for LCD devices has increased considerably. In order to match functional and exterior requirements of the LCD devices, the backlight module design for LCD devices has gradually become multidimensional.

Generally speaking, light source modules within the backlight module are mainly divided into light emitting diode (LED) light sources and fluorescent lamp light sources. FIG. 1a shows a schematic view of a side type backlight module using LEDs as the light source. As shown in FIG. 1a, the LED light sources 20 are disposed on the lower lateral side of the frame 10 of the backlight module, and a reflector 30 and a back plate 50 are disposed under. A flexible circuit board 21 for signal and electric energy connection and transmission paths is commonly disposed. The flexible circuit board 21 sticks out of the backlight module from between the frame 10 and the back plate 50, therefore there are less issues of fastening and arrangement.

For the fluorescent lamp light sources, flexible circuit boards generally cannot be used as the signal and power supply connection paths, consequently wires are usually used as signal and power supply transmission interface. In addition, since some LED light sources has certain size and design requirements, it is necessary to replace the flexible circuit boards with the wires as the signal and power supply transmission paths. Due to the wires are susceptible to deformation causing troubles to assemble the backlight module and the panel, the wires constantly have to be hold securely. FIG. 1b shows a conventional method of securing the wires. As shown in FIG. 1b, a wire holding element 80 having a trough 81 is generally attached to a base 70 by fastening or attachment to hold firmly the wires 23 within the trough 81. Although this method can hold firmly the wires effectively, the cost for new components and assembly time are increased.

SUMMARY OF THE INVENTION

It is an object of the present invention to provide a backlight module and a wire positioning/holding device for the frame structure to hold firmly various wires contained within the backlight module.

It is another object of the present invention to provide a backlight module and a wire holding device for the frame structure that reduces the number of the required components.

It is a further object of the present invention to provide a backlight module and a wire holding device for the frame structure that simplifies the assembly process and reduces the working hours.

The backlight module according to the present invention mainly includes a frame and a light source module. The light source module has wires for signal and power transmission. The light source module is preferably disposed on the lateral side or the bottom of the frame and is partially covered by the frame. The wire holding device of the frame mainly includes a main body and a winding pillar. A first guide slot is disposed on the main body, and the first guide slot has an inlet end and an outlet end. Moreover, the main body includes an upper surface and a side wall. The first guide slot is preferably disposed on the side wall and crosscuts the side wall.

The winding pillar extends from the main body and is situated at one side of the first guide slot. The winding pillar and the main body form a wire holding portion. The wire holding portion is preferably a slit formed between the winding pillar and an edge of the upper surface of the main body. The wire holding portion is disposed corresponding to the outlet end of the first guide slot to receive the wires of the light source module coming out of the outlet end. In addition, the wire holding portion and the outlet end of the first guide slot are situated on opposite side of the winding pillar.

The wires of the light source module bend and enter the first guide slot from the inlet end of the first guide slot. Then, the wires are wound around the winding pillar from the outlet end of the first guide slot. The wires being bent again are fastened up immediately to the wire holding portion formed by the winding pillar and the edge of the upper surface of the main body. The wires extending outward from the wire holding portion stick out of the frame along the bend portion of the winding pillar, and are connected to the signal source or power supply when further assembled. Because the wire holding portion is preferably narrower than the diameters of the wires, it is able to hold the wires and prevents them from coming off the wire holding portion easily. Furthermore, since the wires have been bent and coiled several times and gone through directional changes before being held by the wire holding portion, such structural changes can enhance immobilized capability of the wires and overall structural stability without increasing the manufacturing time and processes.

DETAILED DESCRIPTION OF THE PREFERRED EMBODIMENT

The present invention provides a backlight module and a wire positioning/holding device for the frame structure to hold firmly various wires contained within the backlight module. For the preferred embodiment, the backlight module according to the present invention is used in a liquid crystal display (LCD) device. However, in other embodiments, the backlight module having the wire holding device in accordance with the present invention may be used in computer keyboards, cell phone buttons, billboards and other devices requiring flat light sources. Specifically speaking, the present invention further includes a LCD device using the wire holding device.

Figure 1A:
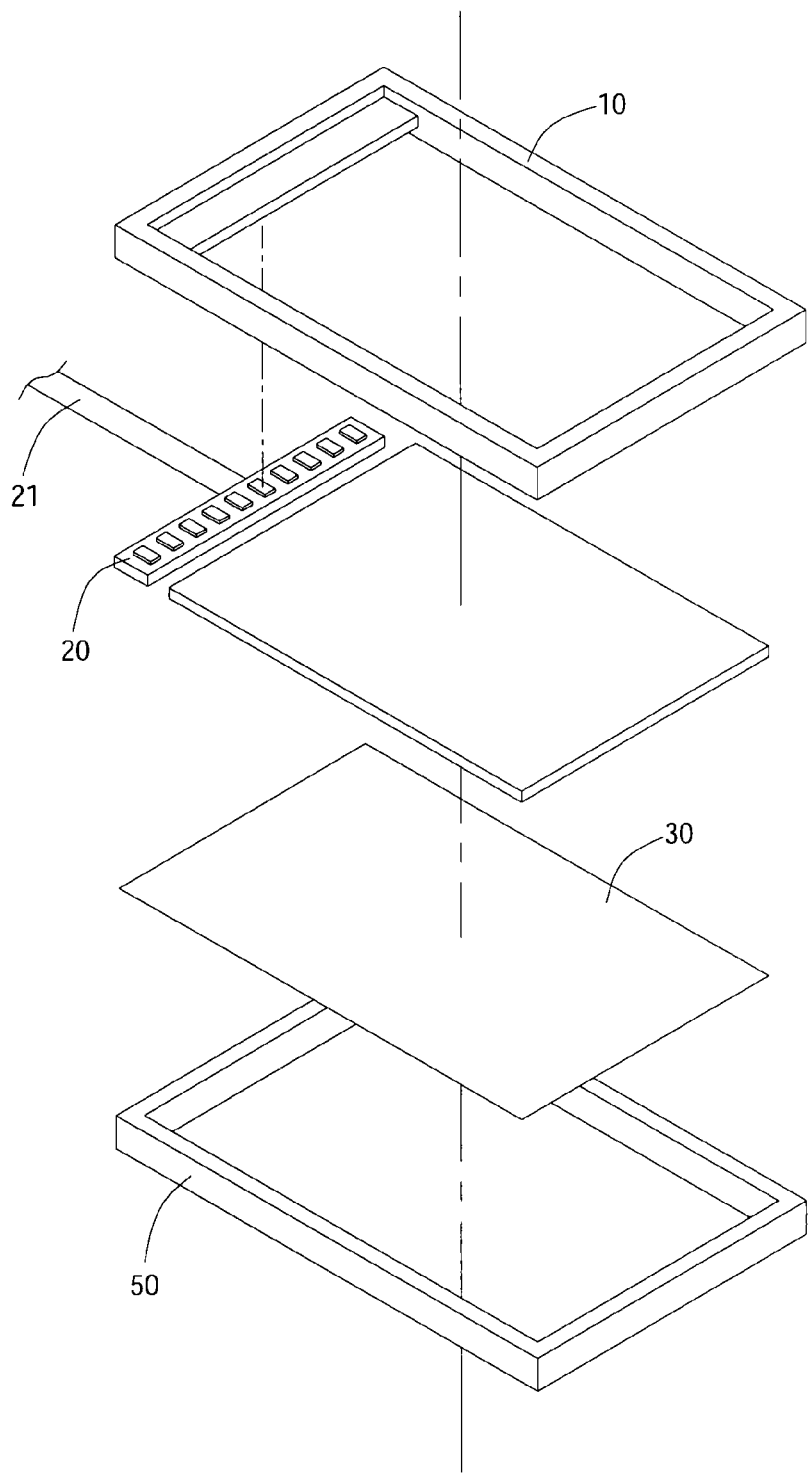
FIG. 1a is a schematic view of a conventional backlight module.
Figure 1B:
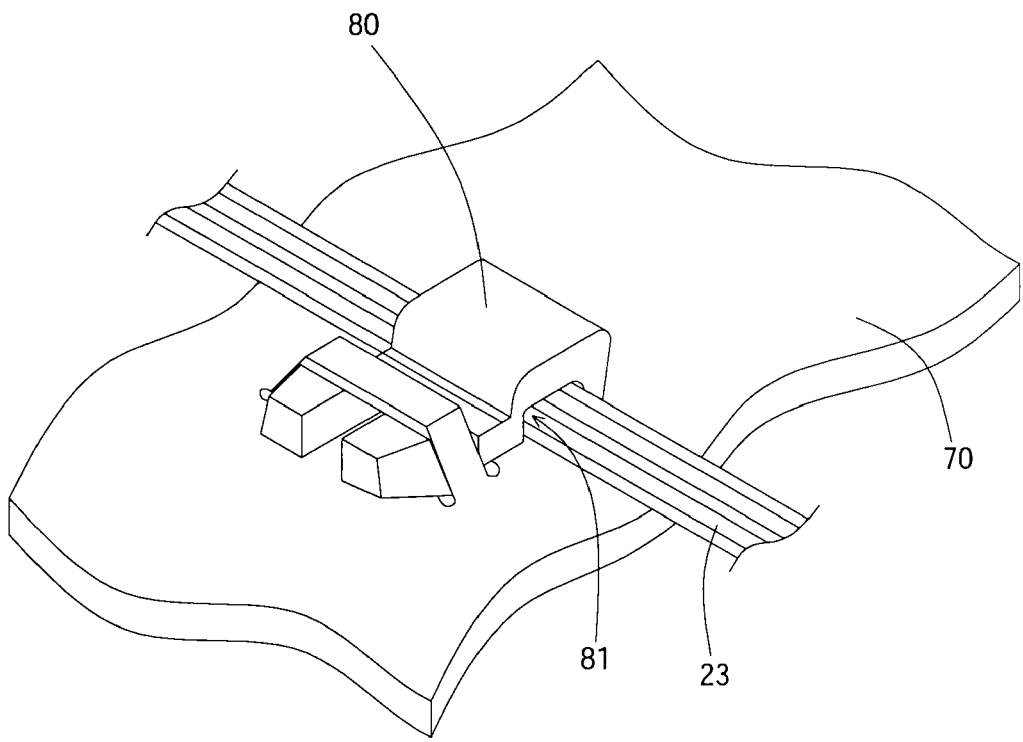
FIG. 1b is a schematic view of a wire positioning/holding device of a light source module of a conventional backlight module.
Figure 2:
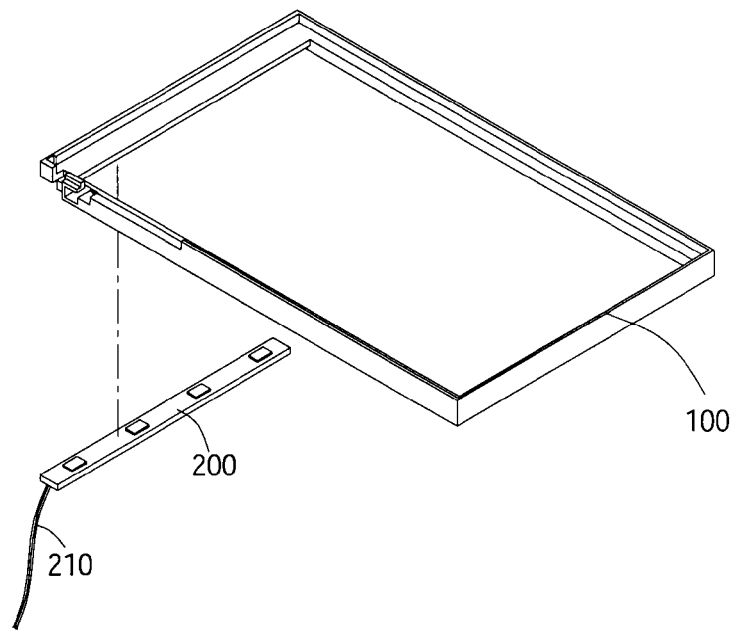
FIG. 2 is an exploded view of the backlight module according to one embodiment of the present invention.

As shown in FIG. 2, the backlight module mainly includes a frame 100 and a light source module 200. The light source module 200 has wires 210 for signal and energy transmission, and the wires 210 preferably extend from the edge of the light source module 200. The light source module 200 is preferably disposed on a lateral side or the bottom of the frame 100 and is partially covered by the frame 100. Moreover, in the embodiment shown in FIG. 2, the light source module 200 preferably uses light emitting diodes (LED) as the light sources; however, in other embodiments, the light source module 200 may use cathode ray tubes (CRT) or other light sources.

Figure 3:
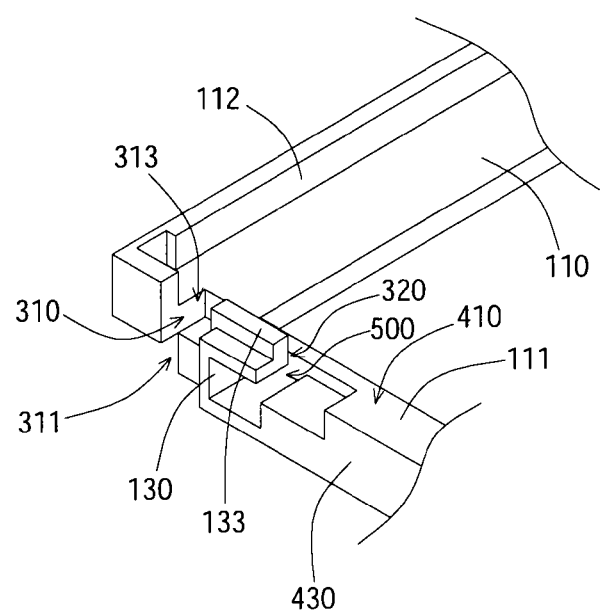
FIG. 3 is a schematic view of the wire holding device of the frame of the backlight module according to one embodiment of the present invention.

As shown in FIG. 3, the wire holding device of the frame 100 mainly includes a main body 110 and a winding pillar 130. A first guide slot 310 is disposed on the main body 110, and the first guide slot 310 has an inlet end 311 and an outlet end 313. The inlet end 311 of the first guide slot 310 is for the wires 210 of the light source module 200 to enter the first guide slot 310; the outlet end 313 is for the wires 210 to come out of the first guide slot 310. As shown in FIG. 3, the main body 110 includes an upper surface 410 and a side wall 430. The first guide slot 310 is preferably disposed on the side wall 430 and crosscuts the side wall 430, and the outlet end 313 of the first guide slot 310 is formed on the upper surface 410 of the frame 100. In other words, the first guide slot 310 communicates with the upper surface 410 of the frame 100. In addition, as shown in FIG. 3, the first guide slot 310 is an open-ended guide slot, i.e. the first guide slot 310 is a guide slot dented inward from the side wall 430. However, in other embodiments, the first guide slot 310 may be a close-ended guide slot, i.e. except the inlet end 311 and the outlet end 313, the remainder of the first guide slot 310 is closed within the main body 110.

Figure 4:
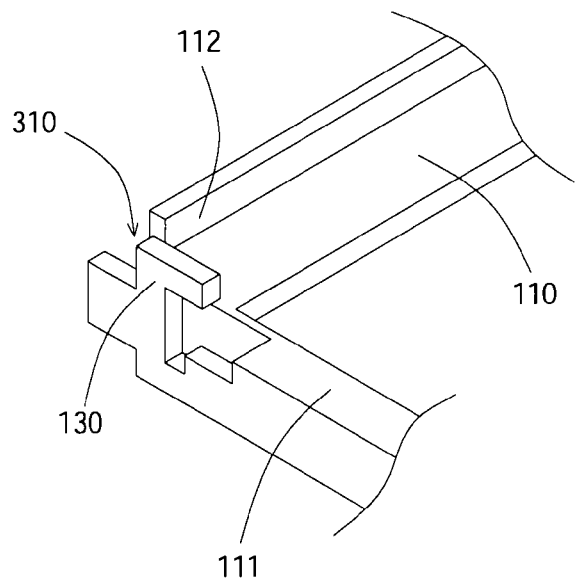
FIG. 4 is a schematic view of the wire holding device of the frame according to another embodiment of the present invention.

In the embodiment shown in FIG. 2 and FIG. 3, the main body 110 includes a first prop 111 and a second prop 112, and the second prop 112 is connected to the first prop 111 and crosses the first prop 111. The light source module 200 is preferably disposed along the second prop 112 and is partially covered by the second prop 112. As shown in FIG. 3, the first guide slot 310 is preferably disposed on the side wall 430 of the first prop 111, and the outlet end 313 is formed on the upper surface 410 of the first prop 111. However, in other embodiments, as shown in FIG. 4, the first guide slot 310 may be disposed on the second prop 112.

The winding pillar 130 extends from the main body 110 and is situated on one lateral side of the first guide slot 310. In the embodiment shown in FIG. 3, the winding pillar 130 extends from the first prop 111 of the main body 110, and the winding pillar 130 and the first guide slot 310 are both disposed in a place where the first prop 111 and the second prop 112 are connected to each other. However, in the embodiment shown in FIG. 4, the first guide slot 310 and the winding pillar 130 are disposed on the second prop 112 and on the first prop 111 respectively. Furthermore, in order to match different circuit arrangement requirements, the first guide slot 310 and the winding pillar 130 may be disposed on the middle portion of the first prop 111 or of the second prop 112.

In the embodiment shown in FIG. 2 and FIG. 3, the winding pillar 130 and the main body 110 form a wire holding portion 500. As shown in FIG. 2 and FIG. 3, the wire holding portion 500 is preferably a slit formed between the winding pillar 130 and an edge of the upper surface 410 of the main body 110, and is narrower than the diameters of the wires 210 of the light source module 200 and than the width of the first guide slot 310. However, in other embodiments, the wire holding portion 500 may be a slit formed between the winding pillar 130 and the side wall 430 or other parts of the main body 110, and the width may not necessarily be smaller than the width of the first guide slot 310. The wire holding portion 500 is disposed corresponding to the outlet end 313 of the first guide slot 310 to receive the wires 210 of the light source module 200 coming out of the outlet end 313. Moreover, the wire holding portion 500 and the outlet end 313 of the first guide slot 310 are situated on opposite sides of the winding pillar 130. In other words, the wires 210 coming out of the outlet end 313 cannot enter the wire holding portion 500 until being coiled at least once.

As shown in FIG. 3, the main body 110 further has a second guide slot 320 disposed thereon. The second guide slot 320 interconnects the first guide slot 310 and the wire holding portion 500. In this embodiment, the second guide slot 320 is disposed on the upper surface 410 of the main body 110, and one end is connected to the outlet end 313 of the first guide slot 310, and the other end is connected to the wire holding portion 500. However, in other embodiments, the main body 110 may not include the second guide slot 320, and the wires 210 enter the wire holding portion 500 directly through the upper surface 410 of the main body 110 after being wound around the winding pillar 130. In the embodiment shown in FIG. 3, the second guide slot 320 is disposed on one lateral side of the winding pillar 130 and spreads along the first prop 111 direction. The second guide slot 320 is preferably perpendicular to the first guide slot 310; however, in other embodiments, other-degree included angles may also exist between the second guide slot 310 and the first guide slot 310. Moreover, as shown in FIG. 3, the second guide slot 320 is an open-ended guide slot; in other words, the second guide slot 320 is a guide slot dented inward from the upper surface 410. However, in other embodiments, the second guide slot 320 may be a close-ended guide slot, i.e. except the two ends connected to the outlet end 313 and the wire holding portion 500, the remainder of the second guide slot 320 is closed within the main body 110.

Figure 5:
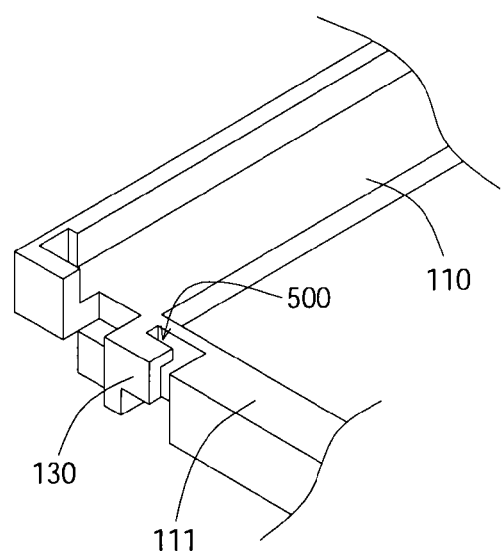
FIG. 5 is a schematic view of the winding pillar in another embodiment.
Figure 6:
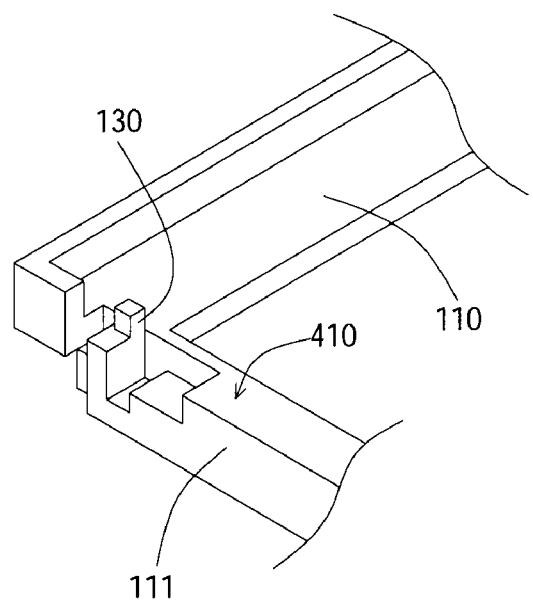
FIG. 6 is a schematic view of the winding pillar in a further embodiment.

In the embodiment shown in FIG. 3, the winding pillar 130 extends toward the upper surface 410 from the bottom end of the side wall 430 of the main body 110, and the first guide slot 310 extends along the extending direction of the winding pillar 130. However, in other embodiments, as shown in FIG. 5, the winding pillar 130 may extend on the side wall 430 along the spread direction of the first prop 111. The wire holding portion 500 at this time formed between the winding pillar 130 and the main body 110 is formed on a plane parallel to the upper surface 410 of the main body 110. In addition, in the embodiment shown in FIG. 3, one lateral side of the winding pillar 130 is also used as the inner wall of the first guide slot 310. However, in the embodiment shown in FIG. 6, the winding pillar 130 extends upward from the upper surface 410 of the main body 110, and one lateral side thereof is not used as one side of the first guide slot 310.

Figure 7:
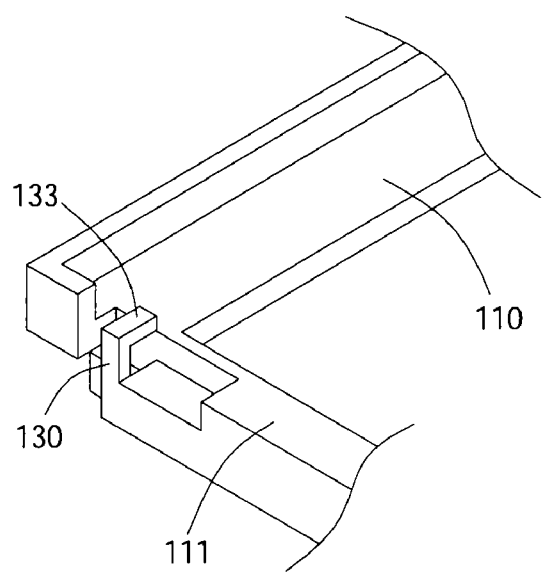
FIG. 7 is a schematic view of the bend portion on the winding pillar in another embodiment.

As shown in FIG. 3, the winding pillar 130 has a bend portion 133. The bend portion 133 is formed on the top of the winding pillar 130 and forms the wire holding portion 500 with the main body 110. In this embodiment, the bend portion 133 extends along a direction parallel to the upper surface 410 of the main body 110 and parallels the extending direction of the first prop 111. However, in the embodiment shown in FIG. 7, the bending direction of the bend portion 133 may also be perpendicular to the extending direction of the first prop 111. In the embodiment shown in FIG. 3, besides forming the wire holding portion 500 with the main body 110, the bend portion 133 also has direction guiding capability for the wires 210.

Figure 8:
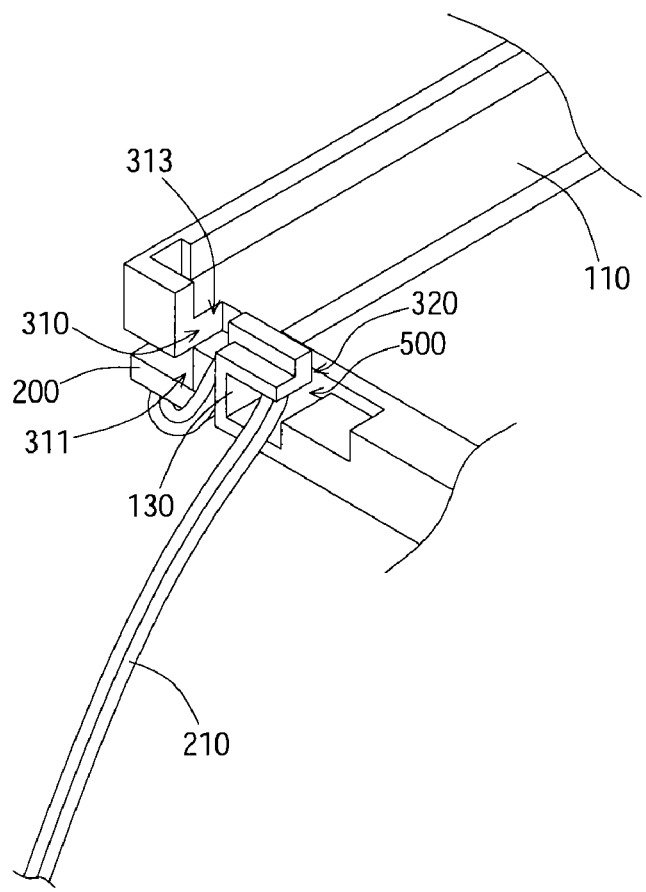
FIG. 8 is an assembly diagram of the backlight module in accordance with one embodiment of the present invention.

FIG. 8 shows the assembly embodiment of the frame 100 and the light source module 200. As shown in FIG. 8, the wires 210 of the light source module 200 bend and enter the first guide slot 310 from the inlet end 311 of the first guide slot 310. Then, the wires 210 enter the second guide slot 320 from the outlet end 313 of the first guide slot 310 and are wound around the winding pillar 130. The wires 210 being bent again are fastened up immediately to the wire holding portion 500 formed by the winding pillar 130 and the edge of the upper surface 410 of the main body 110. The wires 210 extending outward from the wire holding portion 500 stick out of the frame 100 along the bend portion 133 of the winding pillar 130, and are connected to the signal source or power supply when further assembled. Because the wire holding portion 500 is preferably narrower than the diameters of the wires 210, it is able to hold the wires 210 and prevents them from coming off the wire holding portion 500 easily. Furthermore, since the wires 210 have been bent and coiled several time and gone through directional changes before being held by the wire holding portion 500, such structural changes can enhance immobilized capability of the wires 210 and overall structural stability without increasing the manufacturing time and processes.

From the foregoing, it shall be appreciated that specific embodiments of the invention have been described herein for purposes of illustration, but that various modifications and alterations may be made by those skilled in the art without deviating from the spirit and scope of the invention. For example, it shall be understood that there is no intention to limit the winding pillar 130 the specific forms disclosed, but on the contrary, the invention is to cover all modifications, alternate constructions and equivalents falling within the spirit and scope of the invention. Accordingly, the invention is not limited except as by the appended claims.

What is claimed is:

1. A light emitting diode (LED) backlight module comprising:
   a frame comprising:
      a main body having a first prop, a first guide slot disposed on said first prop having an inlet end and an outlet end; and
      a winding pillar extending from said first prop and situated at one side of said first guide slot, wherein said winding pillar and said first prop form a wire holding portion disposed corresponding to said outlet end, and said wire holding portion and said outlet end are situated on opposite sides of said winding pillar; and
   a LED light source module disposed corresponding to either one side or a bottom of said frame, wherein said LED light source module includes a wire, said wire enters into said first guide slot through said inlet end and is guided by said first guide slot out the first guide slot through said outlet end in a direction crosscutting the direction of extension of the first prop, and circuits around said winding pillar after passing through said outlet end and enters said wire holding portion,
   wherein said first prop further has a second guide slot disposed thereon, said second guide slot interconnects said first guide slot and said wire holding portion, and said wire reaches said wire holding portion through said second guide slot after passing through said outlet end of said first guide slot.

2. The LED backlight module of claim 1, wherein said main body of said frame further includes a second prop connected to said first prop, and a portion of said second guide slot forms said outlet end with said first prop.

3. The LED backlight module of claim 1, wherein said first prop includes an upper surface and a side wall, said first guide slot is disposed on said side wall and crosscuts said side wall, and said outlet end of said first guide slot is formed on said upper surface.

4. The LED backlight module of claim 3, wherein said first guide slot extends along the extending direction of said winding pillar from said first prop.

5. The LED backlight module of claim 4, wherein said second guide slot is disposed on said upper surface of said first prop and is perpendicular to said first guide slot.

6. The LED backlight module of claim 3, wherein said winding pillar is connected to a bottom end of said side wall and extends toward said upper surface along said side wall.

7. The LED backlight module of claim 6, wherein said winding pillar and an edge of said upper surface of said first prop together form said wire holding portion.

8. The LED backlight module of claim 1, wherein said winding pillar includes a bend portion formed on a top end of said winding pillar and forming said wire holding portion with said first prop.

9. The LED backlight module of claim 8, wherein said bend portion extends along a direction parallel to an upper surface of said first prop.

* * * * *